Patented May 1, 1923.

1,453,468

UNITED STATES PATENT OFFICE.

LOUIS P. KRAUS, JR., OF NEW YORK, N. Y.

PROCESS FOR MAKING REFRACTORY PRODUCTS.

No Drawing.  Application filed August 23, 1918.  Serial No. 251,092.

*To all whom it may concern:*

Be it known that I, LOUIS P. KRAUS, Jr., a citizen of the United States, residing at New York, in the borough of Manhattan and State of New York, have invented a new and useful Improvement in Processes for Making Refractory Products, of which the following is a full, clear, and exact description.

My invention relates to the manufacture of refractory products employed for withstanding high furnace temperatures, which products may be used either in loose granular form or in moulded kiln burned shapes. The object of the process is to increase the heat resistance of such materials and also to provide a material which may be compressed or moulded into bricks or blocks or refractory wares with the use of no bond or very little bonding material. On the other hand, on account of the high percentage of voids and the spongy character of the grains, and their high absorbent power the material may be moulded with a higher percentage of bond than is normally employed, if this is desired.

The treatment in accordance with the invention also greatly increases the resistance of the bricks or blocks over that of present refractory moulded material. Heretofore, the refractory materials requiring bond for moulding or shaping such as bauxite, chrome, magnesite, quartz, kaolin, clay, etc., have been seriously decreased in heat resistance by the presence of the bond having a lower softening point. In such cases, the heat resistance of the block is at a point somewhere between the resistance of the material itself and that of the bond, usually about midway between these points or temperatures. I have found that the material resulting from my process, even when combined with a bond for moulding or shaping, has a considerably higher resisting power than the corresponding materials when similarly bonded without being subjected to my process.

The natural materials also contain impurities having lower softening points than the pure material thus lessening their resistance; and have also distinct cleavage planes along which failure starts at high temperatures. By the use of my invention these cleavage planes are destroyed and the impurities are partly or wholly driven off or eliminated.

Moreover, owing to the spongy character of the product of my process and its rough, irregular shape in grains with the lack of cleavage planes, the material under consideration under pressure will bond itself together to form a shaped block, brick or refractory article without the use of a binder.

In carrying out my invention in its preferred form, I reduce the raw refractory material to a fine and preferably impalpable powder and mix it with finely ground combustible material, using preferably a large proportion of the latter to give good separation of the refractory particles during the heat treatment. As the combustible I preferably use ground wood, on account of its cheapness; and the preferable proportions are two parts by volume of ground wood to one part by volume of the mineral.

The intimately mixed materials are then mixed with water or liquids of a bonding nature, such as glucose, or other suitable material, and are moulded into blocks of a convenient size which are dried.

When the blocks are thoroughly dried they are roasted at a temperature sufficient to produce clinkered material which when crushed are in the form of spongy grains with the cleavage planes destroyed.

This temperature is preferably about 300° F. below the melting point of the material and is above roasting or calcining temperature. I preferably first beat up the mixed material, and at a time when it has reached a temperature below its melting point, oxygen preferably in the form of air is fed into the furnace to consume the oxidable impurities, thus driving off the impurities to a considerable extent. This heating may be continued as long as desirable.

The blocks or "biscuit" are then removed from the furnace and crushed to the proper degree of fineness best adapted to the purpose for which they are to be used.

The refractory material thus formed is composed of refractory grains of highly irregular shape with rough surfaces well adapted to knit together under pressure and having a high percentage of voids, the material being of a highly spongy nature.

The spongy grains have a surface which may be described as arborescent and may be likened to a chestnut burr; and they have no definite lines or planes of cleavage. Their heat resisting properties are much greater than those of the material from which they are made and they may be used in loose form or may be compressed into bricks or blocks or other refractory articles.

Referring specifically to bauxite as an example of my invention, the following may be taken as a fair sample of bauxite:

| | |
|---|---:|
| $Al_2O_3$ | 55.10 |
| $SiO_2$ | 11.60 |
| $Fe_2O_3$ | 4.41 |
| $H_2O$ | 29.90 |

If the water in such bauxite were driven off by ordinary calcination, $Fe_2O_3$ would be present to the extent of about 6.3 per cent of the total.

When treated by my process, the analysis of the grains produced is subtantially as follows:

| | |
|---|---:|
| $Al_2O_3$ | 82% |
| $SiO_2$ | 17% |
| $Fe_2O_3$ | 1% |

This material can be compressed and moulded dry into the desired form with no bonding material and will retain its shape and may be handled and placed in a kiln of the ordinary type for burning in the same manner as brick are usually burned, except that for a brick composed of grains of a given material the burning temperature employed should preferably be considerably higher than would be employed for the same material in the making of a brick by the usual process.

The advantages of my improved process is plain as it is a well known fact that with brick as usually made, the higher the temperature at which they may be burned in the kiln the higher are the service conditions that they will endure. If a bond is used it may be employed in small proportions to prevent substantial impairing of the heat resisting qualities; or, if desired, a greater amount of bonding material may be used than ordinarily on account of the spongy character, the high percentage of voids, and lack of definite cleavage planes. Where bond is used the resisting quality of the material is not reduced thereby to the extent that it is in the ordinary refractory materials. The volume of the material may be decreased under moulding pressure to a much greater extent than with the usual refractory materials.

Given a certain raw refractory material, if grains of the same sieve size of my material are compared with the grains of other products made from the same original material, it will be found that my material has a much greater percentage of voids, and this characteristic is what I intend to cover by the word "spongy" or of high porosity.

The advantages of my material will be obvious to those skilled in this art since by using my process the heat resistance qualities are greatly improved and longer life given under high temperatures. The material may be bonded or not, as desired, and any desired percentage of bond may be used. The material may be formed into any desirable shapes for resisting high temperatures and is adaptable to a wide variety of uses.

The roasting operation may be carried out in any desirable manner and with any desirable type of furnace and the material may be roasted either in loose powdered form or in the form of cakes which are subjected to the oxidizing atmosphere which drives off impurities, breaks up the definite cleavage planes and produces the clinkered material in the form of spongy grains having the characteristics above described.

Fluxes may be added to the material if desired. If binders are used in moulding the material, I may use any ceramic bond such as plastic clay. In compressing and shaping the material I preferably use a high pressure of from fifteen to twenty tons per square inch.

I claim:

1. The method of treating refractory material consisting in roasting a ground mixture of the material and a combustible at such a clinkering temperature below its melting point as to produce a clinkered material in the form of spongy grains free from crystalline structure.

2. The method of treating and purifying impure refractory material consisting in roasting it in finely divided condition in the presence of a combustible and at such a clinkering temperature below its melting point in an oxidizing atmosphere as to produce a clinkered material in the form of spongy grains.

3. The method of treating refractory material consisting in grinding it to a powder, mixing the powder with a finely divided combustible, and roasting in an oxidizing atmosphere at such a clinkering temperature below its melting point as to produce a clinkered material in the form of spongy grains free from definite cleavage planes.

4. The method of treating bauxite consisting in grinding the same to powder, mixing the powder with finely divided combustible material, and roasting it at such a clinkering temperature below its melting point as to produce a clinkered material in the form of spongy grains.

5. In the treatment of refractory material, the steps consisting of roasting a finely divided mixture of the material and a combustible at such a clinkering temperature below its melting point in an oxidizing atmosphere as to produce a clinkered mass or biscuit formed of spongy grains, and breaking up the mass to the fineness desired.

6. In the treatment of refractory material, the steps consisting of roasting a finely divided mixture of the material and a combustible at such a clinkering temperature below its melting point in an oxidizing atmosphere as to produce a clinkered mass or biscuit formed of spongy grains, breaking up the mass into grains, and forming the spongy grains into a shaped refractory product.

7. The method of treating refractory material consisting in roasting the ground mixture of the material with a combustible and a binder at such a clinkering temperature below its melting point as to produce a clinkered material in the form of spongy grains free from crystalline structure.

8. The method of treating refractory material, consisting in roasting it in finely divided condition in the presence of a combustible and a binder in an oxidizing atmosphere and at such a clinkering temperature below its melting point as to produce a clinkered material in the form of spongy grains free from crystalline structure.

9. The method of treating refractory material comprising the steps of forming a mixture containing the refractory material in a finely divided condition and a finely divided combustible, and converting the refractory material into the form of spongy grains by heating the mixture in an oxidizing atmosphere at a clinkering temperature within about 300° F. of the melting point of the material.

10. The method of treating refractory material comprising the steps of forming a mixture containing the refractory material in a finely divided condition and a finely divided combustible, and converting the refractory material into the form of spongy grains by heating the mixture under oxidizing conditions to a temperature so closely approaching the melting point of the material as to clinker it into a mass of such grains.

11. The method of treating refractory material comprising the steps of forming a mixture containing the refractory material in a finely divided condition and a finely divided combustible, and converting the refractory material into the form of spongy grains by heating the mixture in an oxidizing atmosphere to a sufficiently high clinkering temperature.

12. The method of treating refractory material comprising the steps of forming a mixture containing the refractory material in a finely divided condition and a larger amount by volume of a finely divided combustible, and roasting the mixture in an oxidizing atmosphere at such a clinkering temperature below its melting point as to produce a clinkered material formed of spongy grains.

13. The method of treating and purifying refractory materials containing impurities having lower softening points than the pure materials, comprising the step of roasting a finely divided mixture of the material and a combustible in an oxidizing atmosphere at a clinkering temperature below the melting point of the material, but sufficiently high to drive off such impurities and to produce a clinkered material in the form of spongy grains.

14. The method of treating refractory material comprising the step of roasting the finely divided mixture of the material and a combustible in an oxidizing atmosphere at a clinkering temperature so closely approaching the melting point of the material as to convert it into non-crystalline spongy grains having a high percentage of voids and without definite cleavage planes.

In testimony whereof, I have hereunto set my hand.

LOUIS P. KRAUS, Jr.